(12) United States Patent
Swisterski

(10) Patent No.: US 10,955,232 B2
(45) Date of Patent: Mar. 23, 2021

(54) SMART SCALE RULER

(71) Applicant: Joanne Swisterski, Toronto (CA)

(72) Inventor: Joanne Swisterski, Toronto (CA)

( * ) Notice: Subject to any disclaimer, the term of this patent is extended or adjusted under 35 U.S.C. 154(b) by 0 days.

(21) Appl. No.: 16/027,043

(22) Filed: Jul. 3, 2018

(65) Prior Publication Data

US 2020/0011647 A1 Jan. 9, 2020

(51) Int. Cl.
*G01B 3/20* (2006.01)
*G01B 3/00* (2006.01)
*G01B 3/04* (2006.01)

(52) U.S. Cl.
CPC .............. *G01B 3/004* (2013.01); *G01B 3/04* (2013.01); *G01B 3/205* (2013.01)

(58) Field of Classification Search
CPC ..................................................... G01B 3/205
See application file for complete search history.

(56) References Cited

U.S. PATENT DOCUMENTS

| | | | | |
|---|---|---|---|---|
| 2,252,311 | A * | 8/1941 | Ware ......................... | G01B 3/04 33/489 |
| 4,563,555 | A * | 1/1986 | Ohtani .................... | G01B 3/205 200/16 A |
| 5,479,719 | A * | 1/1996 | Liu ........................... | B43L 7/04 33/449 |
| 5,901,458 | A * | 5/1999 | Andermo ............. | G01D 5/2086 324/207.24 |
| 6,247,240 | B1 * | 6/2001 | Economaki ............ | G01B 3/006 33/27.03 |
| 2002/0035790 | A1 * | 3/2002 | Barton .................... | G09F 11/23 33/1 SB |
| 2017/0038190 | A1 * | 2/2017 | Douglas ................. | G01B 5/163 |

FOREIGN PATENT DOCUMENTS

FR 2658349 A1 * 8/1991 ............... G09F 9/00

* cited by examiner

*Primary Examiner* — Charlie Y Peng
(74) *Attorney, Agent, or Firm* — Hodgson Russ LLP

(57) ABSTRACT

Smart Scale Ruler is an electronic architect's scale having a triangular shaped ruler body. The Smart Scale Ruler has a changeable electronic display for displaying a custom or the desired scale of any unit of length, for a document or plan. A set of depressible buttons function as the inputs for the value of the reference point a user wishes to base the custom scale off of, as well as different settings for the device, in order to display the correct scale on the electronic display.

14 Claims, 5 Drawing Sheets

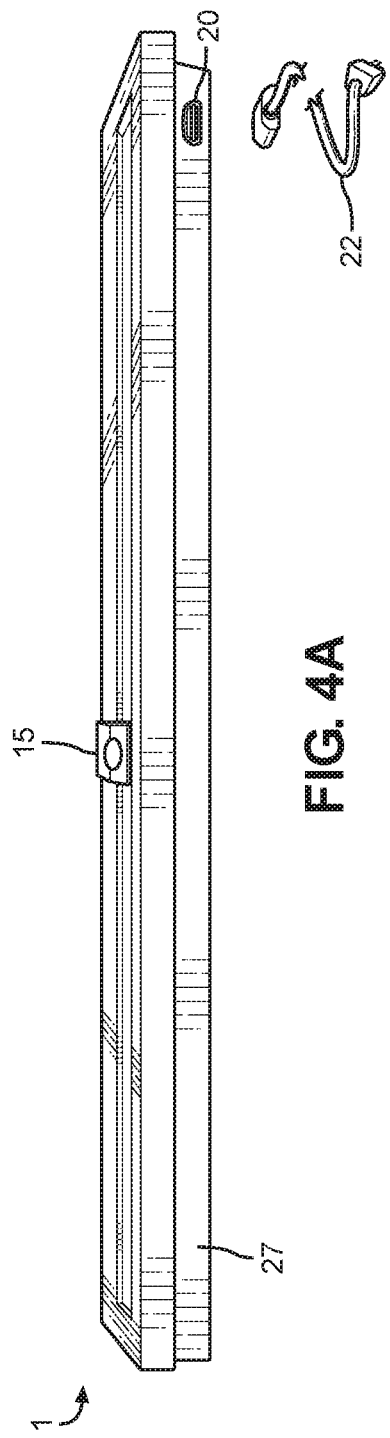
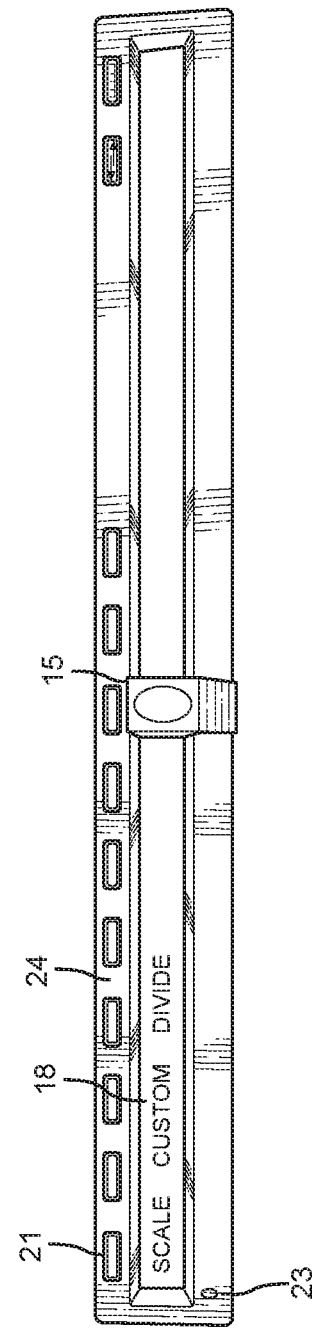
FIG. 4A
FIG. 4B

SMART SCALE RULER

CROSS-REFERENCE TO RELATED APPLICATION

The present application is related to and claims priority from prior provisional application Ser. No. 62/528,427, filed Jul. 3, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of drafting instrument devices and more specifically relates to an electronic architect's scale structured and arranged to have a display that is able to generate a custom scale based on a reference length, or any preset scale, in any unit.

2. Description of the Related Art

Many of us have been exposed to rulers through schooling to measure distances or to rule straight lines. A specialized ruler named an architect's scale is designed to assist the drafting and measuring of architectural drawings, such as floor plans and orthographic projections that are printed or drafted to a set scale. An architect's scale often features multiple different units of length, which are conventionally limited to a maximum of 12 imperial and 6 metric scales located on sides of a three-lobed triangular scale. As such, an improved architect's scale having improved functionality and the ability to measure drawings not printed to any conventional scale is needed.

Various attempts have been made to solve problems found in drafting instrument devices art. Among these are found in U.S. Pat. No. 5,647,135 to Fuentes et al; U.S. Publication No. 2011/0023312 to Chris Lewis Turner; and U.S. Pat. No. 8,468,705 to John Schneider. This prior art is representative of electronic drafting instrument devices. None of the above inventions and patents, taken either singly or in combination, is seen to describe the invention as claimed.

Ideally, an electronic drafting instrument device should provide improved measuring functionality and, yet would operate reliably and be manufactured at a modest expense. Thus, a need exists for a reliable architect's scale with the flexibility to measure drawings not printed to any conventional scale to avoid the above-mentioned problems of only six metric and 12 imperial conventional scales as found on the prior art drafting scales.

BRIEF SUMMARY OF THE INVENTION

In view of the foregoing disadvantages inherent in the known architectural drafting art, the present invention provides a novel Smart Scale Ruler. The general purpose of the present invention, which will be described subsequently in greater detail is to provide a drafting scale useful for an architect having an electronic display on a length of ruler on which an infinite number of custom or conventional scales are displayed in either metric or imperial, or flipped for ease of reference by using a single reference point. The scale is a triangular scale having interior electronics for improved functionality.

The electronic Smart Scale ruler of the present invention comprises a triangular ruler having three protruding ends and an interior cavity. The triangular ruler comprises electronic processing components, a scale visual display, at least one depressible button, a sliding indicator and a USB port. The USB port of the present invention is useful for charging or otherwise communicating with the interior electronic processing components.

The scale visual display of the present invention is disposed above markings of a ruler and provide numerical units of length for the markings of the ruler. The scale visual display comprises an electrophoretic type display or alternatively any other flat panel display such as an LED display.

The ten buttons on the ruler will correspond to the numbers from 1-0. A user will make use of these numbers while following the screen instructions for inputting the reference and desired new dimension (for custom scale function) or quantity and nature of segments (divide function).

Once complete, the ruler is used as though it were a regular ruler for measuring. The slider allows a user to line up the screen with the edge of the ruler and paper that a user is measuring from or drafting on. At any point in time, the user can use the second button from the right hand side, with a double arrow symbol to convert the ruler from metric to imperial. At any point (other than when inputting numbers), a user can use the first button on the right hand side to go back to the main menu.

The main menu displays the following options: Scale-which presents all of the metric and imperial standard scale options, as well as previously saved custom scales. A user can select any of them and the ruler will generate the standard scale selected. This removes the need to have a regular architect's scale, as all of the options are programmed into the Smart Scale Ruler already. Custom—this creates the custom scales as described above. Divide—this divides segments selected, as described above. The Smart Scale Ruler has 12 button keys that are multifunctional depending on what the screen displays based on the options selected.

A method of use of the present invention includes: using the screen to read a reference dimension (with the help of the mechanical slider to line up with the paper), which you would then input the numerical value of with the button pad. You then enter the dimension you would like the reference dimension to represent with the button pad, following the instructions on the screen, to generate a new custom scale along its entire length for ease of measuring any other dimension on the paper.

For the reference measure, a user would use the ruler on the screen to measure what reference distance to be input to either create a custom scale with or divide. The ruler will appear on the screen after having selected either the 'custom' or 'divide' function from the main menu, and the user having entered their preferred unit either metric or imperial.

The present invention is a useful product for architects, engineers, designers, contractors, landscapers, fencing specialists, plumbers and anyone needing fast, accurate takeoffs from plans. The present invention can accurately receive given linear measurements/scales from blueprints, drawings and maps in order to translate them into a custom or prescribed unit of length on the scale visual display.

The present invention holds significant improvements and serves as a Smart Scale Ruler. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a Smart Scale Ruler, constructed and operative according to the teachings of the present invention.

FIG. 4A is a perspective view illustrating a Smart Scale Ruler according to an embodiment of the present invention of FIG. 1.

FIG. 4B is a perspective view illustrating a Smart Scale Ruler according to an embodiment of the present invention of FIG. 1.

The various embodiments of the present invention will hereinafter be described in conjunction with the appended drawings, wherein like designations denote like elements.

DETAILED DESCRIPTION

Figure 1:
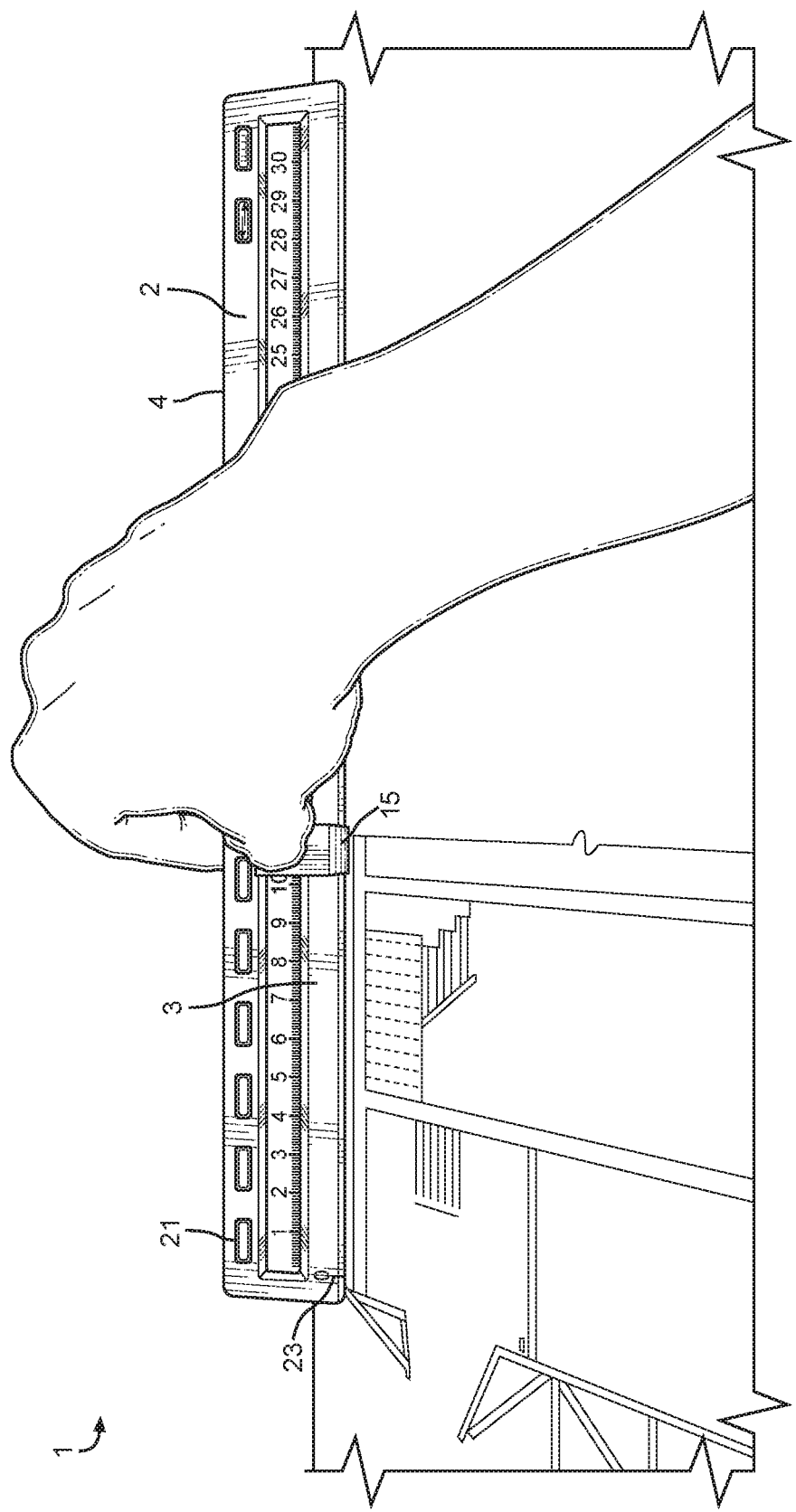
FIG. 1 shows a perspective view illustrating a smart scale ruler according to an embodiment of the present invention.

As discussed above, embodiments of the present invention relate to a Smart Scale Ruler and more particularly to an improved electronic Smart Scale architect's drafting ruler.

Referring to the drawings by numerals of reference there is shown in FIG. 1-5, the present invention comprises an electronic smart scale ruler 1 used in drafting.

Figure 2:
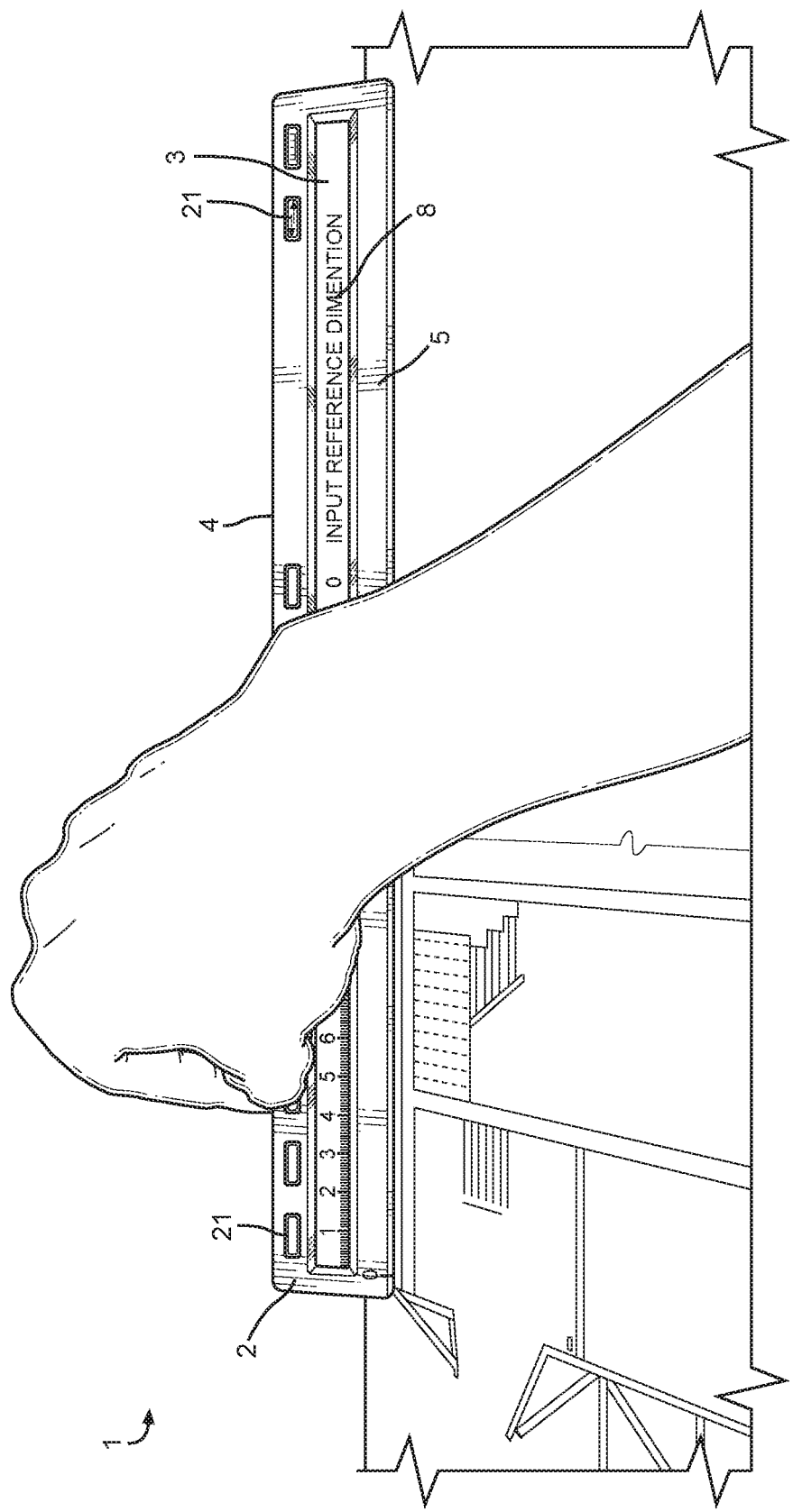
FIG. 2 is a perspective view illustrating a Smart Scale Ruler according to an embodiment of the present invention of FIG. 1.
Figure 3:
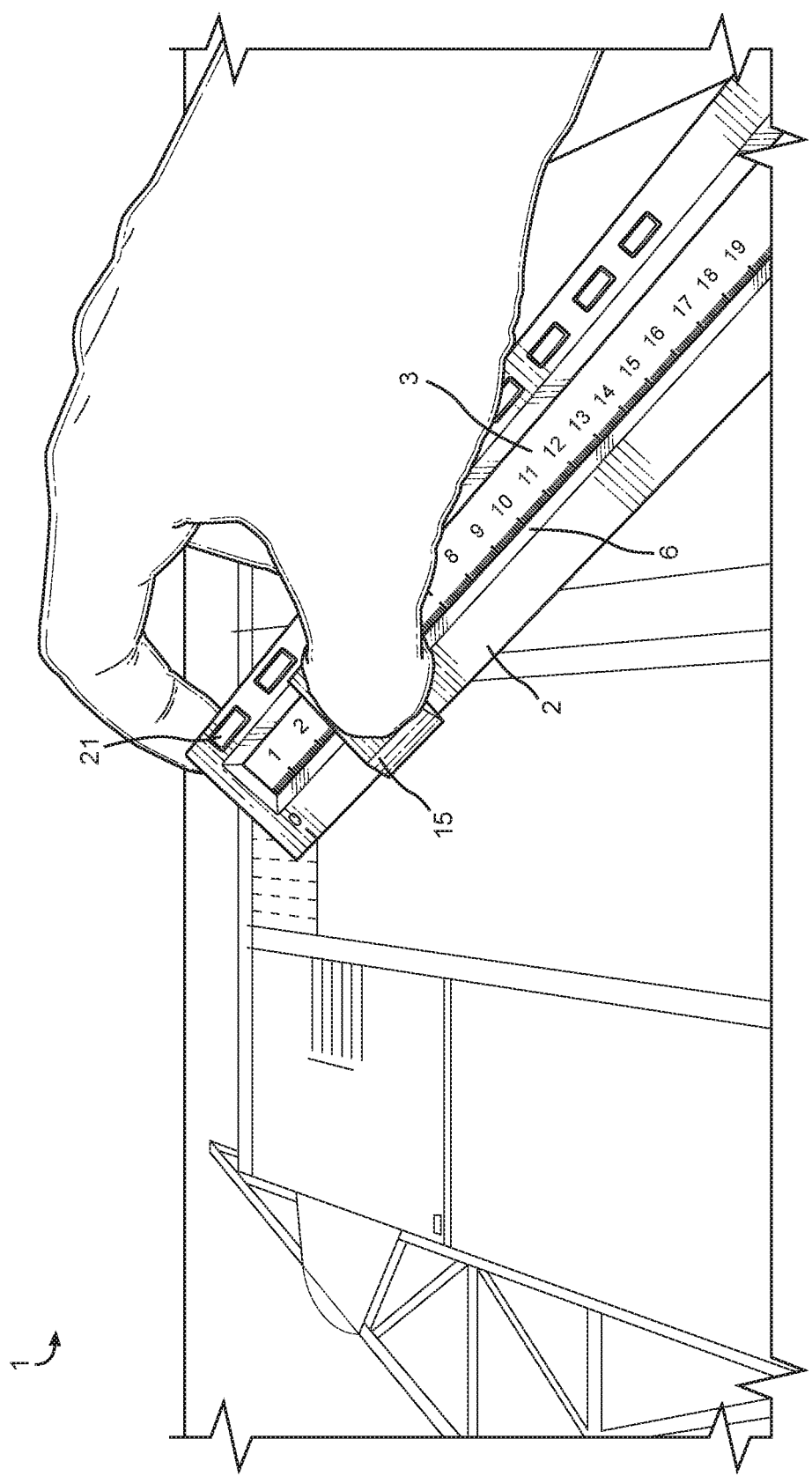
FIG. 3 is a perspective view illustrating a Smart Scale Ruler according to an embodiment of the present invention of FIG. 1.
Figure 5:
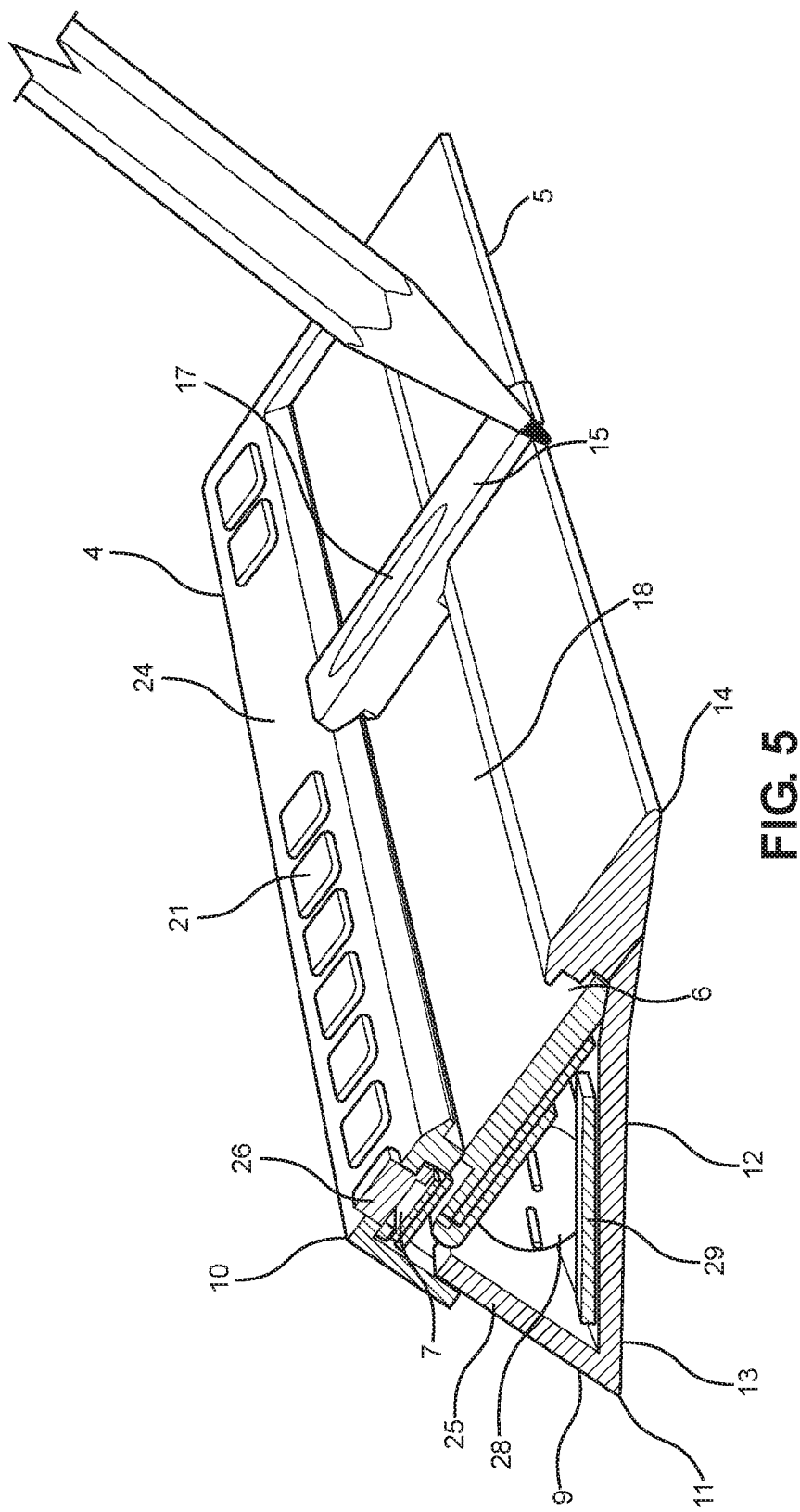
FIG. 5 is a cross-sectional view illustrating a Smart Scale Ruler according to an embodiment of the present invention of FIG. 1.

In FIG. 1, the electronic smart ruler 1 comprises an elongated main body 2 including an elongated front panel 3 at least a portion of which is made of any suitable material such as aluminum 24 (FIG. 4B). The elongated front panel 3 includes a plurality of control buttons 21, an elongated front top side edge 4 and an elongated front bottom side edge 5 (FIG. 2). An elongated slider groove 6 (FIG. 3) is also present on the elongated front panel 3 and extends along a substantial length thereof. The elongated front panel 3 further includes indicia 8 (FIG. 2) thereon adapted to delineate a plurality of spaced reference points. The elongated main body 2 includes a plastic rear housing 25.

The elongated main body 2 further comprises an elongated back panel 9 (FIG. 5) having an elongated back upper side edge 10 and an elongated back lower side edge 11 spaced and parallel to the elongated back upper side edge 10. The elongated back upper side edge 10 is connected to the elongated front top side edge 4 of the elongated front panel 3.

The elongated main body 2 also comprises an elongated base panel 12 which includes an elongated base forward side edge 14 and an elongated base rear side edge 13 which is spaced and parallel to the elongated base forward side edge 14. The elongated base forward side edge 14 is connected to the elongated front bottom side edge 5 of the elongated front panel 3. The elongated base rear side edge 13 is connected to the elongated back lower side edge 11 of the back panel 9.

The elongated front panel 3, the back panel 9 and the bottom panel 12 form a triangular volume having a hollow interior space.

The electronic smart ruler 1 also includes a slider member 15 is adapted to visually delineate a slider reference point. The slider member 15 is adapted to slide within the elongated slider groove 6 of the elongated front panel 3 and has indicia 17 thereon.

An electronic visual display 18 is attached to the elongated front panel 3 and is adapted to display information generated by at least one electronic processing component 28. The electronic visual display 18 is formed as an electrophoretic display or a light emitting diode (LED) display. Element 23 is a reference point for dimensions. The electronic processing component 28 is located within the interior space of the elongated main body 2 and is electronically connected to the plurality of control buttons 21 by way of silicon button pads on SMT switches 26. The electronic processing component 28 is adapted to generate custom scales and display them along the length of the electronic visual display 18 with the help of a PCB (Printed Circuit Board) 29 which is electronically connected thereto.

A power source 22 (FIG. 4A) is formed as a USB cable and is adapted to releasably connect with a USB port 20 with an external power supply and is electronically connected to at least one electronic processing component 28 and also to the electronic visual display 18 for providing electrical power thereto.

The control buttons 21 on the elongated front panel 3 are electronically connected to the at least one processing component 28 by way of electronic contacts 7. Each of the control buttons 21 is adapted to command the processing component 28 to calculate a particular numeric value based upon the numeric values entered. Two of the plurality of control buttons 21 are adapted to provide imperial units and three of the control buttons are adapted to provide metric units. Ten of the control buttons 21 are adapted to provide numeric values of zero through nine respectively. The imperial units provide values in feet or inches. The metric units provide values in meters or centimeters or millimeters. Six of the control buttons 21 are adapted to command differing functions chosen from a list of functions consisting of switching, setting, clearing/zeroing, adding, subtracting and entering.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An electronic smart ruler comprising:
   an elongated main body including:
      an elongated front panel including;
         an elongated front top side edge; and
         an elongated front bottom side edge spaced and parallel to said
         elongated front top side edge;
         an elongated slider groove including:
            a plurality of electronic contacts thereon along a substantial length thereof; and
            wherein said elongated slider groove extends along a substantial length of said elongated front panel; and
            indicia thereon adapted to delineate a plurality of spaced reference points;
      an elongated back panel including;
         an elongated back upper side edge; and
         an elongated back lower side edge spaced and parallel to said elongated back upper side edge;
         wherein said elongated back upper side edge is connected to said
         elongated front top side edge of said elongated front panel; and
      an elongated base panel including;
         an elongated base forward side edge; and
         an elongated base rear side edge spaced and parallel to said elongated base forward side edge;
         wherein said elongated base forward side edge is connected to said elongated front bottom side edge of said elongated front panel; and
         wherein said elongated base rear side edge is connected to said elongated back lower side edge of said elongated back panel;
      wherein said elongated front panel, said elongated back panel, and said elongated base panel form a triangular volume having a hollow interior space;
   a slider member including;
      electronic contacts thereon adapted to contact said plurality of electronic contacts of said elongated slider groove, such that its position with respect to said elongated slider groove can be determined electronically;
      indicia thereon adapted to visually delineate a slider reference point; and
      wherein said slider member is adapted to slide within said elongated slider groove of said elongated front panel;
   an electronic visual display;
      wherein said electronic visual display is attached to said elongated front panel and is adapted to display information generated by electronic processing components;
   at least one electronic processing component;
      wherein said at least one electronic processing component is located within said interior space of said elongated main body and is electronically connected to said plurality of electronic contacts of said elongated slider groove and to said electronic contacts of said slider member;
      wherein said at least one electronic processing component is adapted to calculate numeric values based on the position of said slider member within said elongated slider groove and display values upon said electronic visual display; and
      wherein said at least one electronic processing component is adapted to generate custom scales and display them along the length of said electronic visual display; and
   a power source;
      wherein said power source is electronically connected to said plurality of electronic contacts of said elongated slider groove, to said at least one electronic processing component, and to said electronic visual display for providing electrical power thereto.

2. The electronic smart ruler of claim 1, further comprising a plurality of control buttons attached to said elongated front panel and electronically connected to said at least one electronic processing component; and wherein each of said plurality of control buttons is adapted to command said at least one electronic processing component to calculate a particular numeric value based upon the position of said slider member within said elongated slider groove.

3. The electronic smart ruler of claim 2, wherein two of said plurality of control buttons are adapted to provide imperial units.

4. The electronic smart ruler of claim 2, wherein three of said plurality of control buttons are adapted to provide metric units.

5. The electronic smart ruler of claim 2, wherein ten of said plurality of control buttons are adapted to provide the numeric values of 0 through 9 respectively.

6. The electronic smart ruler of claim 3, wherein said imperial units provide values in feet.

7. The electronic smart ruler of claim 3, wherein said imperial units provide values in inches.

8. The electronic smart ruler of claim 4, wherein said metric units provide values in meters.

9. The electronic smart ruler of claim 4, wherein said metric units provide values in centimeters.

10. The electronic smart ruler of claim 4, wherein said metric units provide values in millimeters.

11. The electronic smart ruler of claim 2, wherein six of said plurality of control buttons are adapted to command differing functions chosen from a list of functions consisting of switching, setting, clearing/zeroing, adding, subtracting, and entering.

12. The electronic smart ruler of claim 1, wherein said power source is formed as a USB cable adapted to releasably connect with an external power supply.

13. The electronic smart ruler of claim 1, wherein said electronic visual display is formed as an electrophoretic display.

14. The electronic smart ruler of claim 1, wherein said electronic visual display is formed as a light emitting diode display.

* * * * *